(12) United States Patent
Wang et al.

(10) Patent No.: US 8,799,590 B2
(45) Date of Patent: Aug. 5, 2014

(54) SYSTEM ENABLING TRANSACTIONAL MEMORY AND PREDICTION-BASED TRANSACTION EXECUTION METHOD

(75) Inventors: Hua Yong Wang, Beijing (CN); Charles Brian Hall, Calgary (CA); Yan Qi Wang, Beijing (CN); Zhi Yong Liang, Beijing (CN); Xiao Wei Shen, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 686 days.

(21) Appl. No.: 12/463,113

(22) Filed: May 8, 2009

(65) Prior Publication Data
US 2009/0292884 A1  Nov. 26, 2009

(30) Foreign Application Priority Data
May 23, 2008  (CN) .......................... 2008 1 0109178

(51) Int. Cl.
*G06F 9/52*  (2006.01)
*G06F 9/46*  (2006.01)

(52) U.S. Cl.
CPC ............... *G06F 9/528* (2013.01); *G06F 9/467* (2013.01)
USPC ........................................................ 711/150

(58) Field of Classification Search
None
See application file for complete search history.

(56) References Cited

U.S. PATENT DOCUMENTS

| 2005/0060559 | A1 | 3/2005 | McKenney |
| 2006/0085591 | A1 | 4/2006 | Kumar et al. |
| 2008/0005504 | A1* | 1/2008 | Barnes et al. ................. 711/156 |
| 2009/0172306 | A1* | 7/2009 | Nussbaum et al. ........... 711/154 |

FOREIGN PATENT DOCUMENTS

CN             101097544 A        1/2008

OTHER PUBLICATIONS

Maurice Herlihy and J. Eliot B. Moss. "Transactional Memory: Architectural Support for Lock-Free Data Structures." May 1993. ACM. ISCA '93.*
M. M. Walliullah and Per Stenstrom. "Intermediate Checkpointing with Conflicting Access Prediction in Transactional Memory Systems." Apr. 2008. IEEE. IPDPS 2008.*

* cited by examiner

*Primary Examiner* — Nathan Sadler
(74) *Attorney, Agent, or Firm* — Suiter Swantz pc llo

(57) ABSTRACT

A system enabling Transactional Memory with overflow prediction mechanism, comprising: prediction unit for predicting the mode for the next execution of a transaction based on the final status of the previous execution of the transaction; execution unit for executing the transaction in the execution mode predicted by the prediction unit, wherein the execution mode comprises overflow mode and non-overflow made. According to this invention, before a transaction is executed, it is predicted whether or not the transaction will overflow, and therefore, the execution of the transaction which is necessary to determine whether or not an overflow will occur is saved.

13 Claims, 9 Drawing Sheets

SYSTEM ENABLING TRANSACTIONAL MEMORY AND PREDICTION-BASED TRANSACTION EXECUTION METHOD

The present application claims the benefit under 35 U.S.C. §119 of China; Application Serial Number 200810109178.4, filed May 23, 2008 entitled "SYSTEM ENABLING TRANSACTIONAL MEMORY AND PREDICTION-BASED TRANSACTION EXECUTION METHOD" which is incorporated herein by reference.

FIELD OF THE INVENTION

This invention relates to a system enabling transactional memory, and particularly, to the overflow prediction in the system enabling transactional memory.

BACKGROUND OF THE INVENTION

The concept of transaction has been widely used in the database field. Differing from the conventional transaction concept, transaction in this disclosure is a special concept in parallel computing field, and refers to the execution of multiple operations, such that the multiple operations appear to be executed together automatically without any intervening operation. For example, if a memory address is accessed within a transaction, the memory address should not be modified by other codes outside the transaction until the transaction completes.

Transaction can be implemented directly at computer architecture level. The hardware system implementing transaction at architecture-level is called system enabling Transaction Memory (TM). Using system enabling Transactional Memory can improve software productivity because programmers may not need to worry about using conventional "lock" mechanism to protect shared data, while keeping the performance in an acceptable scope.

One method for implementing a system enabling Transactional Memory is introduced as follows. A dedicated buffer is added into a processor chip. Instead of being written into memory directly, data modified by a transaction (speculative data) is stored in the dedicated buffer. If two transactions access the same memory address and at least one of them performs a write operation, one of these two transactions has to rollback and re-execute, while the other one continues. This situation is called conflict. If there is no conflict, the data temporarily stored in the dedicated buffer is written into memory at the end of the transaction. This action is called commit. That is, a transaction is executed speculatively, and its result is committed to the memory only if all operations in the transaction are successfully executed speculatively.

FIG. 1 schematically illustrates the principle of such a system enabling Transactional Memory. As illustrated in FIG. 1, hardware buffers 1012 or 1022 are provided in a system enabling transactional memory, for temporarily storing all data to be written by a transaction, i.e., speculative data, during the execution of the transaction. The speculative data stored in the hardware buffers is committed to a memory via a bus 1030 only after the successful execution of all program codes in the transaction. It should be noted that, as another implementation method, hardware buffer 1012 and data cache 1014 may be implemented in one physical hardware device, while hardware buffer 1022 and data cache 1024 may be implemented in one physical hardware device including at least one processor 1010, 1020. With respect to the present invention, this implementation method is substantially the same as that illustrated in FIG. 1, and the spirit of the present invention is applicable to this implementation method also.

In the prior art, all transactions are executed speculatively. During the speculative execution of a transaction, all data written by the transaction is temporarily stored in a hardware buffer, and only if all program codes in the transaction have been executed (in speculation) successfully, the speculative data stored in the hardware buffer is committed to a memory. At that time, the transaction is accomplished successfully.

However, the hardware buffer cannot be very large. If a transaction is large (accesses a lot of addresses), the buffer cannot hold all of the data. Therefore, the buffer will overflow. In the prior art, buffer overflow forces the transaction to abort (referred to as transaction overflow hereinafter) and then the transaction has to be re-executed. In general, when a transaction is re-executed, a time-consuming method is adopted, in order to prevent another overflow, for example by resorting back to traditional lock-based method to run. This invention does not focus on any specific method for handling overflow. In the following description, lock-based method is adopted as an example for the purpose of illustration, and it generally refers to any time-consuming method for handling overflow.

As described above, there are two methods to run a transaction. If the transaction is small, it is executed by a fast method in which the speculative data is stored in a hardware buffer (i.e., execution by using hardware buffer). On the other hand, if the transaction is large, it is run by the slow method based on locking.

In the prior art, however, before the execution of a transaction, it cannot be known whether the transaction will overflow, that is, it cannot be known whether the hardware buffer will overflow during the execution of the transaction. Hence, for any transaction, it is assumed that it will not overflow at the beginning and it is executed by using a hardware buffer. The execution of a large transaction will be aborted due to buffer overflow, and the overflowed transaction is re-executed by the second slow method. Therefore, a large transaction has to be tentatively executed for the first time, and then be re-executed by the lock-based method after its abort. In such a scenario, the first-time execution of a large transaction (i.e., the aborted execution) wastes time and energy, and occupies system resources.

The U.S. patent application document US2005/0060559A discloses a method for determining whether a transaction will overflow or not by running a pseudo-transaction. However, in such method, one execution of the transaction is also necessary to determine whether an overflow will occur or not, and therefore it also wastes time and energy, and occupies system resources.

A hybrid hardware and software implementation of a transactional memory system is disclosed in the U.S. Patent application document US2006/0085591, in which if the hardware transactional memory system overflows, it switches to a software transactional memory system to be executed once again. That is, that patent document provides a method for handling overflowed transaction at the cost of one execution of the transaction with overflow.

SUMMARY OF THE INVENTION

The object of the present invention is to overcome the above drawbacks in the prior art, i.e., to determine whether a transaction will overflow or not before its execution, thereby saving time and energy consumed and system resources occupied by the transaction.

For this purpose, the present invention provides a system enabling Transactional Memory with an overflow prediction mechanism, in which it is predicted before the execution of a transaction whether the transaction will overflow or not, and then the transaction is executed based on the predication result. If a transaction is predicted not to overflow, it is executed in a transactional mode (also called non-overflow mode) in which the transaction is executed by using a hardware buffer. On the other hand, if a transaction is predicted to overflow, it is executed in overflow mode in which the transaction is executed, e.g., with the lock-based method, instead of by using the hardware buffer.

In order to achieve the above purpose, according to one aspect of the present invention, a system enabling Transactional Memory is provided, comprising a prediction unit for predicting the mode for the next execution of a transaction based on the final status of its previous execution, an execution unit for executing the transaction in the mode predicted by the prediction unit. The mode comprises overflow mode and non-overflow mode.

According to another aspect of the invention, a prediction-based transaction execution method is provided, comprising: prediction step for predicting the mode for the next execution of a transaction based on the final status of its previous execution, execution step for executing the transaction in the mode predicted in the prediction step. The mode comprises overflow mode and non-overflow mode.

According to another aspect of the invention, a computer program product is provided, which contains program codes stored in a computer readable media for implementing the method of the present invention.

In the present invention, before the execution of a transaction, the mode for the next execution of the transaction is predicted based on the final status of its previous execution, thereby omitting the need for one execution to determine whether an overflow will occur or not, and thus the system performance is improved and the energy and system resources can be saved.

BRIEF DESCRIPTION OF THE DRAWINGS

Taken in conjunction with the accompanying drawings, the explanative embodiments, the preferred usage, other objects and advantages of the present invention will be better understood from the following detailed description of the explanative embodiments, wherein.

DESCRIPTION OF THE PREFERRED EMBODIMENTS

The detailed description of the preferred embodiments of the present invention will be given below with reference to the drawings.

In the system enabling Transactional Memory according to the present invention, there are three modes for executing a transaction:

1) non-transaction mode for executing the non-transaction codes. In this mode, memory access operations are executed in the normal way;
2) transactional mode, also called as non-overflow mode, for executing a transaction predicted not to overflow. Most transactions are small and are executed in non-overflow mode;
3) overflow mode for executing a transaction predicted to overflow. Due to the limitation of hardware buffer, only few large transactions run in this mode.

Figure 1:
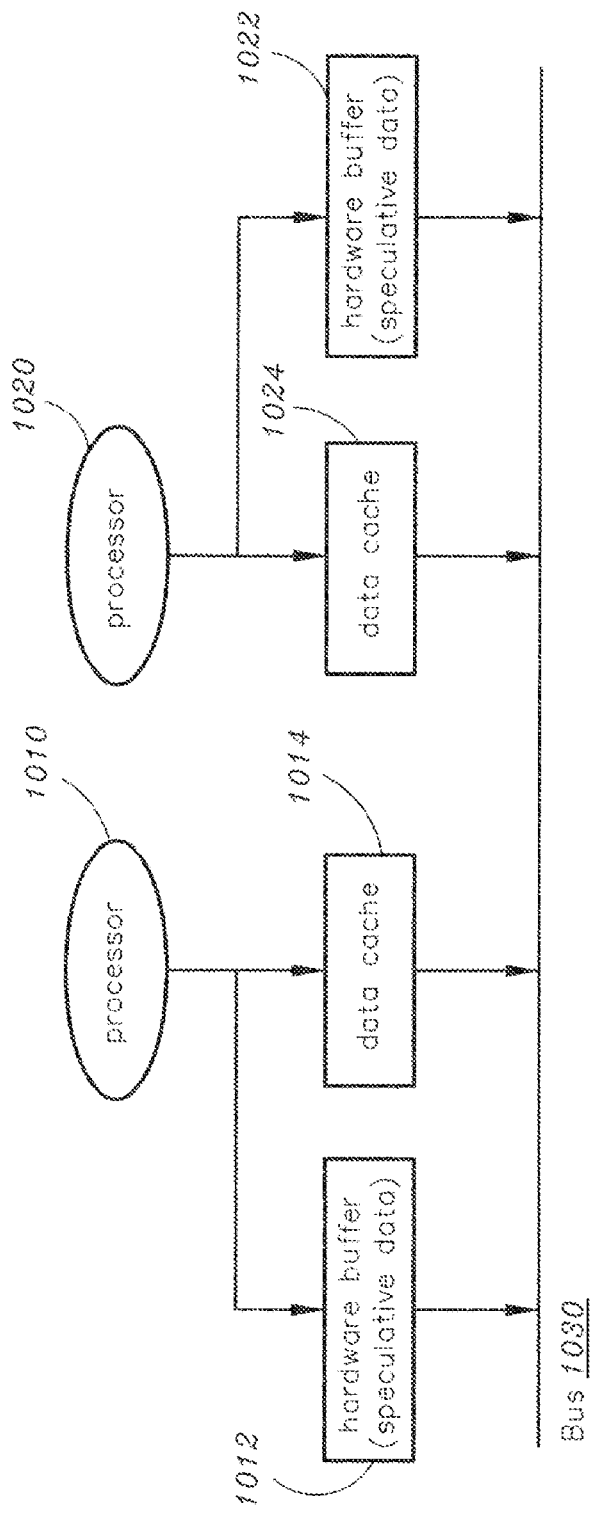
FIG. 1 is a schematic diagram of a system enabling Transactional Memory.
Figure 2:
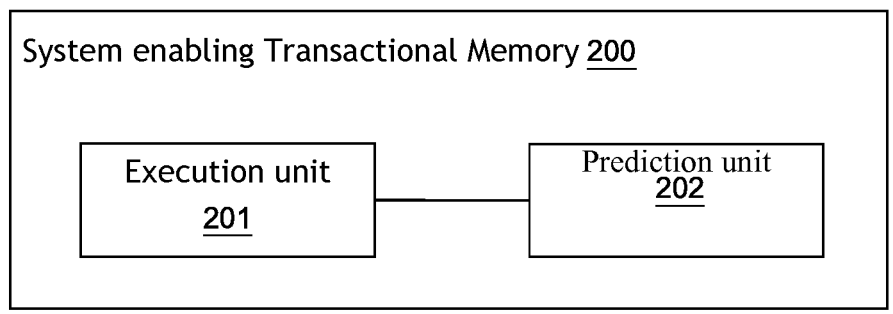
FIG. 2 is a block diagram showing the system enabling Transaction Memory according to the present invention.

FIG. 2 is a block diagram showing the system enabling Transactional Memory with prediction mechanism according to the present invention. As illustrated in FIG. 2, the system enabling Transactional Memory with prediction mechanism 200 according to the present invention comprises a prediction unit 202 and an execution unit 201. The prediction unit 202 predicts the mode for the next execution of a transaction based on the final status of its previous execution, and the execution unit 201 executes the transaction based on the prediction of the prediction unit 202, i.e., in the execution mode predicted by the prediction unit 202 (overflow mode or non-overflow mode).

Preferably, the prediction unit 202 according to this invention contains a lookup table having multiple entries (for example, 32 or more entries), each entry including a physical address field and one or more prediction information fields, wherein the physical address of a transaction, such as the address of the beginning instruction of the transaction, is stored in the physical address field, and information on whether the transaction will overflow in the next execution, i.e., the execution mode information of the transaction, is stored in the corresponding prediction information field(s).

Since the lookup table only has a limited number of entries, the entries have to be replaced if all of them are used. There are various existing algorithms that can be used to select the entries to be replaced, such as round robin, LRU and random.

Preferably, the system enabling Transactional Memory with prediction mechanism 200 according to the present invention may further comprise a status register. The execution unit 201 sets the status register to control the execution of program codes. As to non-transaction program codes, the execution unit 201 sets the status register to non-transaction mode such that the non-transaction program codes are executed in non-transaction mode. As to a transaction predicted as non-overflowed transaction by the prediction unit 202, the execution unit 201 sets the status register to non-overflow mode such that the transaction is executed in non-overflow mode. As to a transaction predicted as an overflowed transaction by the prediction unit 202, the execution unit 201 sets the status register to overflow mode to execute the transaction in overflow mode.

According to the present invention, when a transaction starts to run, for example when the beginning instruction of the transaction is executed, the execution unit 201 searches the lookup table. If there is an entry in the lookup table whose physical address is equal to the address of the transaction, for example the address of the beginning instruction of the transaction, it is called a "hit", otherwise, it is called a "miss". If a search hits, the execution unit 201 executes the transaction in accordance with the execution mode information stored in the prediction information field of the hit entry. For example, if the prediction information in the hit entry indicates overflow mode (that is, the corresponding transaction is predicted to overflow), the status register is set to overflow mode by the execution unit 201, and then the transaction is executed in overflow mode. On the other hand, if the predication information field of the hit entry indicates non-overflow mode (that is, the corresponding transaction is predicted not to overflow), the status register is set to non-overflow mode by the execution unit 201, and the transaction is executed in non-overflow mode. If a search misses, the status register is set to non-overflow mode by the execution unit 201, and then the corresponding transaction is executed in non-overflow mode, as described in detail later. Optionally, the status register may be set to non-overflow mode by the execution unit 201 whenever a transaction finishes.

Figure 3:
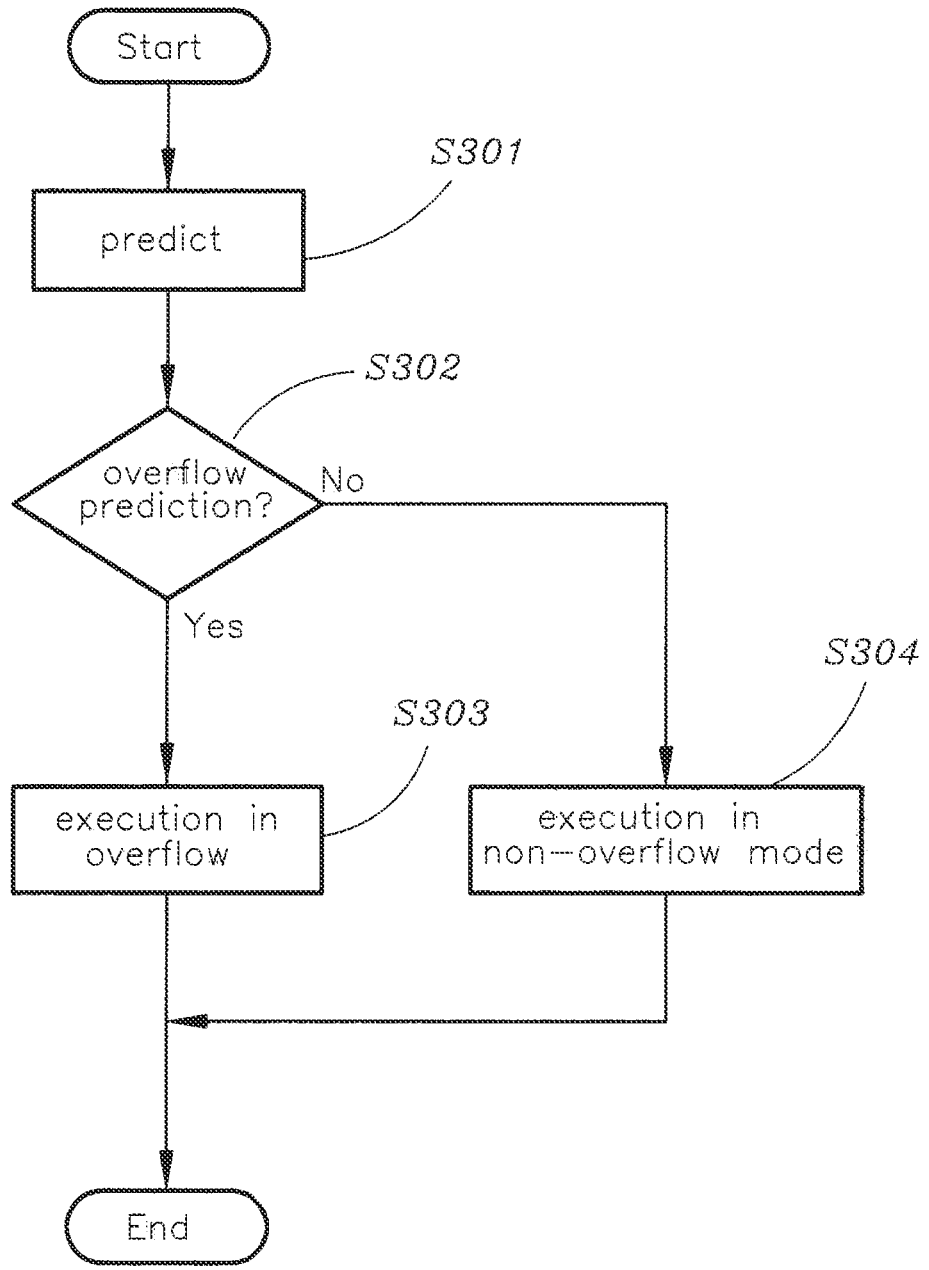
FIG. 3 is a flowchart of the prediction-based transaction execution method according to the present invention.

FIG. 3 shows a flowchart of the prediction-based transaction execution method according to the present invention. At first, a prediction is executed at step S301, that is, the mode for the next execution of a transaction is predicted based on the final status of its previous execution. And then, based on the prediction result in step S301, the transaction is executed in the mode predicted in step S301. It is determined at step S302 whether the prediction of step S301 is an overflow prediction, that is, whether the mode for the next execution predicted at S301 is overflow mode. If it is, the transaction is executed in overflow mode at S303. On the contrary, if the mode for the next execution predicted at S301 is non-overflow mode, the transaction is executed in non-overflow mode at S304.

Figure 4:
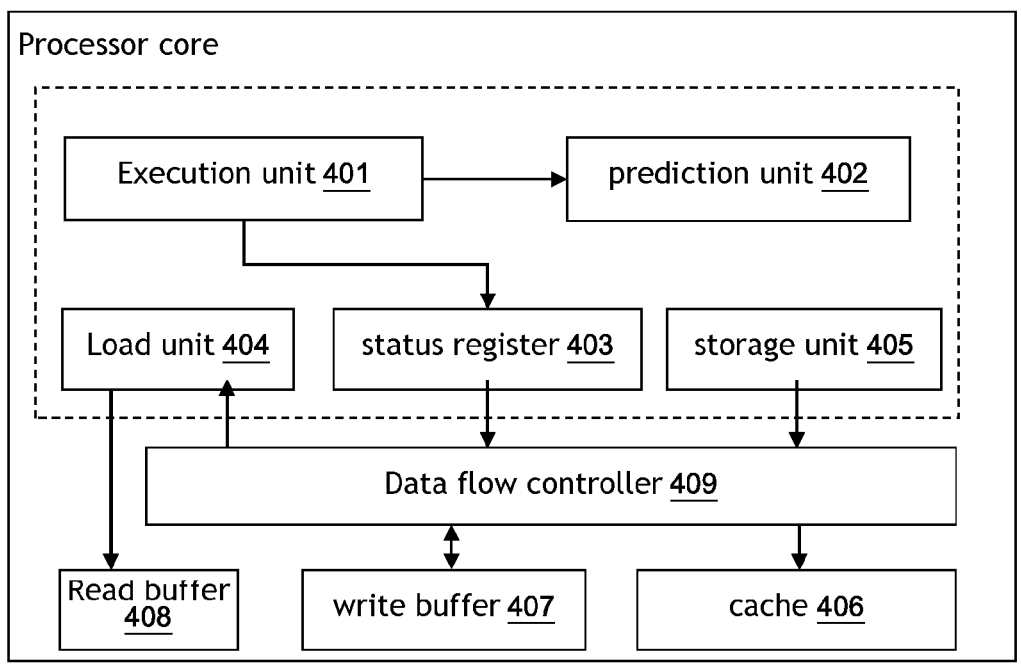
FIG. 4 is a schematic diagram showing an example of the system enabling Transactional Memory according to the present invention, which is implemented in the processor kernel.

FIG. 4 is a schematic diagram showing, as an implementation in the processor kernel, the detailed structure of a system enabling Transactional Memory with prediction mechanism according to the present invention. As shown in FIG. 4, the system enabling Transactional Memory with prediction mechanism 400 according to this invention comprises execution unit 401 and prediction unit 402. The system enabling Transactional Memory 400 may further comprise a load unit 404 for executing read operations, a store unit 405 for executing write operations, a data flow control unit 409 for controlling the data access of the load unit 404 and the store unit 405 (i.e., for controlling the data flow of read operations and write operations), a cache 406, a write buffer 407 and a read buffer 408. Preferably, the system enabling Transactional Memory with prediction mechanism 400 according to this invention further comprises a status register 403. In the example shown in FIG. 4, the status register 403 controls the data flow of read and write operations of a transaction by the data flow controller 409.

According to the present invention, when a transaction is predicted to overflow by the prediction unit 402, that is, when the mode for the next execution of the transaction is predicted as overflow mode, the execution unit 401 executes the transaction in overflow mode, that is, no hardware buffers are used to execute the transaction.

Alternatively, when a transaction is predicted to overflow by the prediction unit 402, the execution unit 401 sets the status register 403 to overflow mode, thereby the status register 403 causes the transaction to run in overflow mode through the data flow controller 409. For example, as to a read operation of the transaction, the load unit 404 will read data directly from the cache 406 under the control of the data flow controller 409. As to a write operation of the transaction, the store unit 405 will write the data directly into cache 406 under the control of the data flow controller 409.

When a transaction is predicted not to overflow by the prediction unit 402, that is, the mode for the next execution of the transaction is predicted as non-overflow mode, the execution unit 401 executes the transaction in non-overflow mode, that is, the transaction is executed by using hardware buffers (write buffer 407 and read buffer 408).

Alternatively, when a transaction is predicted not to overflow by the prediction unit 402, the execution unit 401 sets the status register 403 to non-overflow mode, thereby the status register 403 causes the execution of the transaction in non-overflow mode, through the data flow controller 409.

It may be understood by those skilled in the art that, multiplexer, flip-flop and switch can be used to implement the data flow controller 409.

Next, two preferred embodiments are introduced for the process for predicting whether a transaction will overflow or not, i.e., for predicting the mode for the next execution of the transaction, based on the final state of the previous execution of the transaction.

Figure 5:
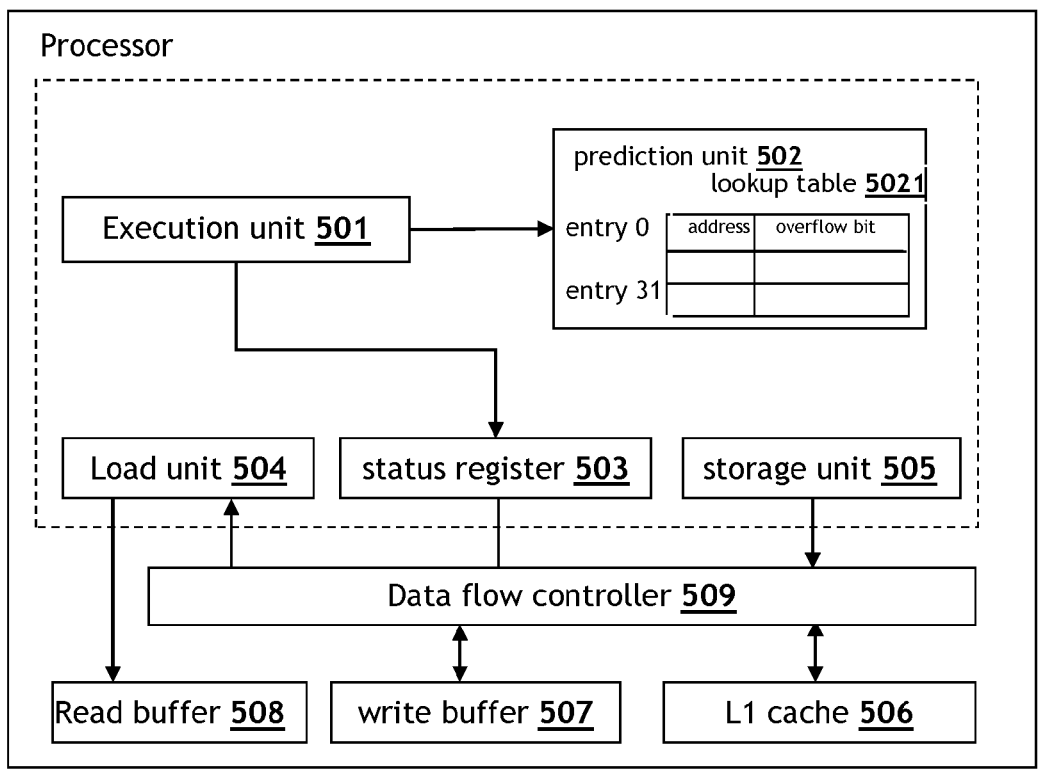
FIG. 5 is a schematic diagram showing the system enabling Transactional Memory according to a first embodiment of the present invention.

FIG. 5 is a schematic diagram showing the system enabling Transactional Memory with prediction mechanism according to a first embodiment of the present invention. In the system enabling Transactional Memory 500 shown in FIG. 5, the prediction unit 502 comprises a lookup table 5021. Each entry in the lookup table has two fields, one is an address field for recording a physical address, and the other is an overflow bit field for recording an overflow bit. If the overflow bit is 1, it indicates that the corresponding transaction is predicted to overflow, that is, the mode for the next execution of the transaction is predicted as overflow mode. On the contrary, if the overflow bit is 0, it indicates that the corresponding transaction is predicted not to overflow, that is, the mode for the next execution of the transaction is predicted as non-overflow mode. Those skilled in the art may understand that, the overflow field may contain a plurality of bits, instead of only one bit. For example, by using a counter with a plurality of bits, the mode for the next execution of a transaction is predicted as overflow mode only when the number of times of overflow reaches a threshold. Such a method is common knowledge in the art, and the following description of the first embodiment only directs to the one bit implementation as an example.

According to the first embodiment of the present invention, the initial state of each entry in the lookup table 5021 is invalid. When a transaction starts, the beginning instruction of the transaction is executed in the execution unit 501. Then, the execution unit 501 searches the lookup table 5021 for the address of the beginning instruction. If the search misses, the address of the transaction, i.e., the physical address of the beginning instruction of the transaction is recorded in the address field of a certain entry in the lookup table 5021, and the overflow bit field of the entry is set to 0, that is, the transaction is predicted not to overflow.

According to the present invention, if the search hits, the status register 503 is set according to the overflow bit in the hit entry.

If the transaction is predicted not to overflow, the execution unit 501 executes the transaction in non-overflow mode.

In the non-overflow mode, as to a write operation of the transaction, instead of writing data into L1 cache 506, the store unit 505 writes data into the write buffer 507 under the control of the data flow controller 509. If it hits the write buffer 507, i.e., if the address pointed to by the transaction write operation is found in the write buffer 507, the data flow controller 509 controls the store unit 505 to write data into the write buffer 507 directly. On the contrary, if it misses write buffer 507, conflict detection is conducted. If no conflict is detected, the store unit 505 will allocate an entry in the write buffer 507 for the write operation, writing the address pointed to by the write operation into the address field of the entry, and writing the data into the corresponding storage field of the entry in the write buffer 507. On the contrary, if a conflict is detected, one transaction is selected to abort. In any case, the transaction is aborted if the write buffer 507 overflows.

In non-overflow mode, as to a read operation of the transaction, the load unit 504 reads data from both L1 cache 506 and the write buffer 507, and checks whether the address pointed to by the read operation hits the read buffer 508. As to a read operation of the transaction, if it hits the write buffer 507, the data from the write buffer 507 is returned under the control of the data flow controller 509, and the data from L1 cache 506 is ignored. If it misses the write buffer 507 but hits the read buffer 508, data from L1 cache 506 is returned under the control of the data flow controller 509. If it misses both the write buffer 507 and the read buffer 508, conflict detection is conducted. If there is no conflict detected, the load unit 504 reads data from L1 cache 506 again, and records the address of the data (i.e., the address pointed to by the read operation) into the read buffer 508. On the contrary, if a conflict is detected, one transaction is selected to abort.

According to the present invention, if a transaction executed in non-overflow mode overflows finally, the overflow bit in the entry corresponding to the transaction is changed to 1 in the lookup table 502, that is, the prediction for the transaction is changed from non-overflow to overflow, thereby the transaction will be executed in overflow mode next time.

If a transaction is predicted to overflow by the prediction unit 502, the execution unit 501 will execute the transaction in overflow mode.

In overflow mode, hardware buffers (i.e., write buffer 507 and read buffer 508) are not used to temporarily hold data and data address during the execution of the transaction. Instead, write operations of the transaction store data into L1 cache 506 directly, and read operations of the transaction read data from L1 cache 506 directly.

According to the first embodiment of the present invention, in overflow mode, besides reading/writing data from/to L1 cache directly, operations inside the transaction also record the write data address (i.e., the address pointed to by write operations of the transaction) in the write buffer 507.

Preferably, when a transaction executed in overflow mode finishes, if the write buffer 507 has enough space to hold the addresses of all write operations inside the transaction, the transaction actually does not overflow, and the overflow prediction for the transaction is incorrect. Hence the prediction unit 502 modifies the overflow bit of the corresponding entry in the lookup table, that is, the overflow prediction for the transaction is modified to non-overflow prediction. On the contrary, if the write buffer 507 does not have enough space to hold the addresses of all write operations inside the transaction, the transaction actually overflows, that is, the overflow prediction for the transaction is correct, and the prediction unit 502 keeps its prediction unchanged, that is, the mode for the next execution of the transaction is still predicted as overflow mode.

Preferably, the read data addresses (i.e., the address pointed to by a transactional read operation) are also recorded in the read buffer 508. When a transaction executed in overflow mode finishes, only if the hardware buffers (i.e., both the write buffer 507 and the read buffer 508) have enough space to hold all addresses accessed by the transaction (including the data addresses pointed to by write and read operations), that is, the write buffer has enough space to record the data addresses of all write operations inside the transaction, and the read buffer has enough space to record the data addresses of all read operations inside the transaction, the overflow prediction for the transaction is incorrect. In that case, the prediction unit 502 modifies the overflow bit of the corresponding entry in the lookup table, that is, the overflow predication for the transaction is modified to non-overflow prediction.

In the above process, the write buffer 507 and/or read buffer 508 provide a bookkeeping function. Optionally, when the transaction finishes, the write buffer 507 and/or read buffer 508 are cleared.

In overflow mode, there is no conflict detection, and address space overflow in hardware buffer does not enforce the transaction to abort since the data has been saved in L1 cache 506.

It will be appreciated, in accordance with the first embodiment of the present invention, when a transaction predicted to overflow finishes, it can be precisely determined whether the transaction has actually overflowed or not. If the overflow prediction is incorrect, the next execution mode of the transaction is predicted not to overflow, otherwise it is still predicted to overflow.

Figure 6:
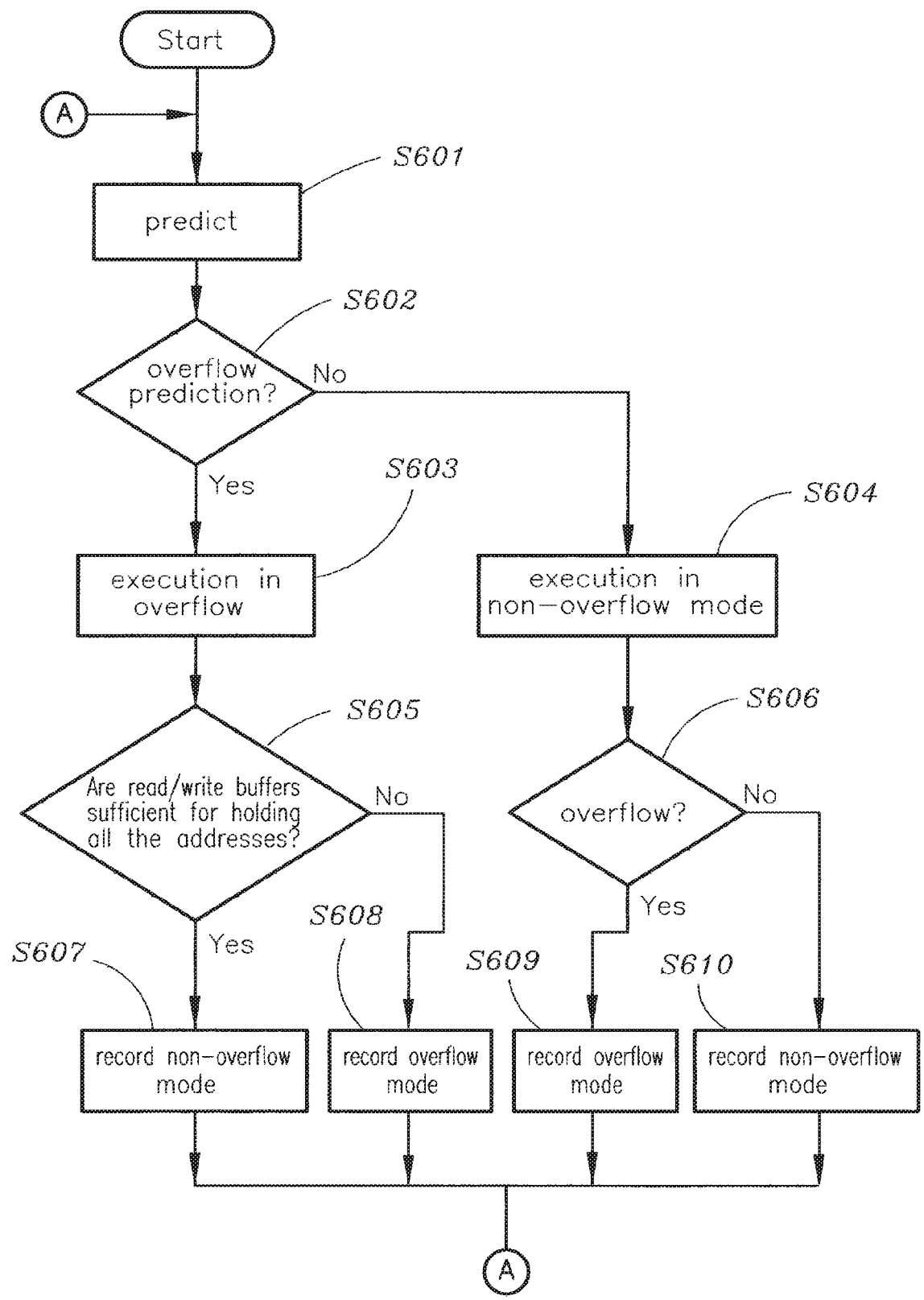
FIG. 6 is a flowchart showing the prediction-based transaction execution method according to the first embodiment of the present invention.

FIG. 6 shows a flowchart of the prediction-based transaction execution method according to the first embodiment of the present invention.

As shown in FIG. 6, at step S601, it is predicted whether a transaction will overflow, i.e., the mode for the next execution of the transaction is predicted. In the above detail description of the first embodiment, the execution mode information stored in the lookup table is read at step S601. Then, it is determined at step S602 whether the prediction at S601 is overflow prediction or not (that is, whether the execution mode predicted (read) at step S601 is overflow mode). If it is an overflow prediction, the transaction is executed in overflow mode at step S603. However, if it is a non-overflow prediction, the transaction is executed in non-overflow mode at step S604.

According to the first embodiment of this invention, the read/write buffers are used to record the read/write data addresses during the execution in overflow mode. Preferably, after the current execution finishes, it is determined at step S605 whether or not the read/write buffer has enough space to record all addresses of the read or written data (i.e., the read or write data addresses). If so, the execution mode information of the transaction is modified to non-overflow mode at step S607, indicating the mode for the next execution is non-overflow mode. Otherwise, the execution mode information of the transaction is kept as overflow mode at step S608, indicating the mode for the next execution of the transaction is overflow mode.

In the case of the execution in non-overflow mode, after the current execution, it is determined whether an overflow occurs in the current execution at step S606. If an overflow occurs, the execution mode information of the transaction is modified to overflow mode in step S609, otherwise, it is kept as non-overflow mode in step S610.

Next, the second embodiment according to the present invention will be described.

In the second embodiment according to the present invention, the system enabling Transactional Memory has an almost identical structure with the first embodiment, the execution of the transaction in non-overflow mode is also almost identical with the first embodiment, except for the processing of the transaction in overflow mode.

According to the second embodiment of this invention, when a transaction is predicted to overflow, it is also predicted how many times the transaction will overflow.

According to the second embodiment of this invention, as to a transaction executed in non-overflow mode, if the current execution of the transaction is aborted due to an overflow, the following N executions of the transaction, instead of only the next one execution, are predicted to overflow by the prediction unit, such that the transaction is predicted to overflow N times by the prediction unit (in the next N predictions for the transaction by the prediction unit, the transaction will always be predicted to overflow), that is, this transaction will be executed in overflow mode in next N executions, and the prediction unit predicts that the N+1th execution of the transaction will not overflow.

Preferably, exponential incremental policy is used to predict how may times the transaction will overflow, i.e., the number N. For example, it is assumed that the prediction unit currently predicts a transaction will overflow N times. The next N executions of the transaction will be in overflow mode. After the N execution of the transaction in overflow mode, the prediction unit flips the prediction bit, i.e., predicts the transaction not to overflow. However if the N+1 execution (in non-overflow mode) overflows again, the prediction unit doubles the N for that transaction, that is, the transaction is predicted to overflow 2N times.

Advantageously, according to the second embodiment of this invention, if a transaction overflows, and the preceding execution of the transaction is in non-overflow mode, a minimum value $N_{min}$ is determined by the prediction unit as the number of times the transaction will overflow; otherwise the prediction unit doubles the number of times N predicted last time as the new number of times the transaction will overflow. Preferably, a maximum number of times a transaction will overflow is set to $N_{max}$. The default minimum $N_{min}$ may be set to 1, certainly it can also be set to some other power of 2 or other integers. The maximum $N_{max}$ depends on the range of data the counter 702 shown in FIG. 7 can store. For example, if the counter 702 has 3 bits, the maximum value is 100 in binary, i.e., 4 in decimal. Since the $N_{max}$ must be a power of 2 in the preferred embodiment, the maximum value is 100 in binary, instead of 111 in binary. The counter 702 is a register in nature and the bit number of counter 702 depends on its specific implementation.

Figure 7:
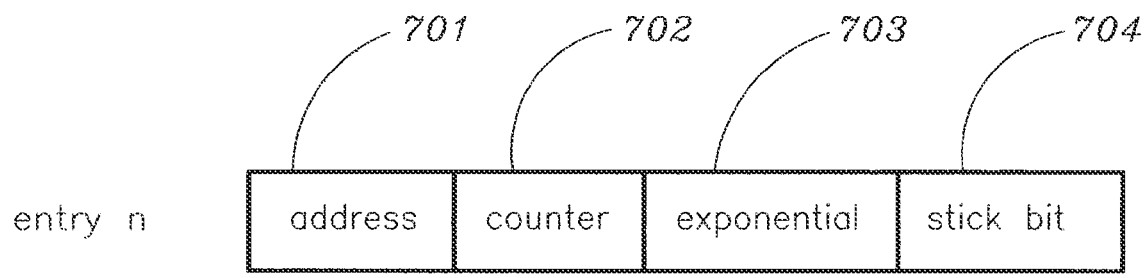
FIG. 7 is a schematic diagram showing an entry of a lookup table in the system enabling Transactional Memory according to a second embodiment of the present invention.

FIG. 7 shows an example of one entry with four fields in the lookup table according to the second embodiment of this invention, wherein the overflow bit field in the first embodiment is replaced with counter field 702. If the content in the counter field 702 (i.e., counter) is 0, it indicates that the corresponding transaction is predicted not to overflow, i.e., the mode for the next execution is non-overflow mode; on the contrary, if the content is not 0, it indicates that the transaction is predicted to overflow, i.e., the mode for the next execution is overflow mode. Each time the transaction is executed in overflow mode, the counter in the corresponding entry is decreased by 1. The content in the exponential field 703 (i.e., the exponential) represents the initial value of the counter.

According to the second embodiment of the present invention, initially, all entries in the lookup table are invalid.

When a transaction begins, the execution unit searches the lookup table.

If the search misses, the address of the transaction, e.g., the address of the beginning instrument of the transaction is recorded into the address field 701 of one lookup table entry. The counter field 702, the exponential field 703, and the stick bit field 704 are all set to 0. The transaction therefore is predicted not to overflow, and executed in non-overflow mode. When the transaction finishes, if an overflow actually occurs, the counter and exponential fields of the corresponding entry are set to 1 and the stick bit field is set to 0.

If the search hits, and the counter is 0, the transaction is predicated not to overflow, and executed in non-overflow mode. Wherein in the case that the stick bit is 0, if the transaction actually overflows when it finishes, the corresponding exponential and counter are set to 1 and the stick bit is set to 0; otherwise, the content in this entry remains unchanged. On the other hand, in the case that the stick bit is 1, if the transaction actually overflows when it finishes, the corresponding exponential is doubled, the counter is set to the same value of the exponential, and the stick bit is set to 0; otherwise, the corresponding exponential and counter are set to 0.

If the search hits and the counter is not 0, the transaction is predicted to overflow and executed in overflow mode. In this situation, each time the transaction is executed in overflow mode, the corresponding counter is reduced by 1. If the counter becomes 0, the corresponding stick bit is set to 1.

Figure 8:
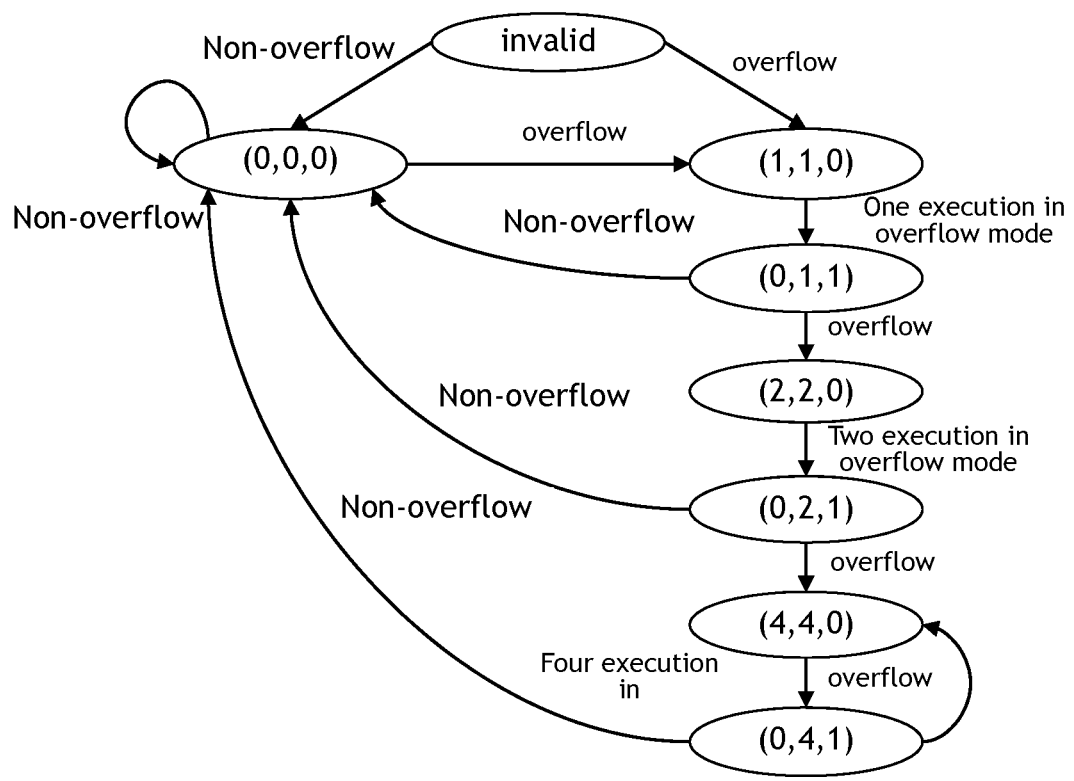
FIG. 8 shows a state machine according to the second embodiment of the present invention.

FIG. 8 shows a state machine illustrating the changes of the counter, exponential and stick bit fields in one lookup table entry of the system enabling Transactional Memory according to the second embodiment of the present invention. The three numbers in the parentheses represent the contents of the counter, exponential and stick bit fields in turn, for example, a tuple (1,1,0) represents a counter with value 1, an exponential with value 1, and a stick bit with value 0. "Non-overflow" means the corresponding transaction is executed in non-overflow mode and no overflow occurs. "Overflow" means the corresponding transaction is executed in non-overflow mode and there is an overflow. "N executions in overflow mode" means the corresponding transaction has already been executed N times in overflow mode.

In the example shown in FIG. 8, the maximum exponential value (i.e., the maximum value $N_{max}$ for the number of times a transaction is predicted to overflow) is 4. In practice, however, the maximum exponential value can be set to any value depending on the number of bits of the exponential field of the lookup table. Further, in the example shown in FIG. 8, the minimum value $N_{min}$ for the number of times a transaction is predicted to overflow is set to 1.

Figure 9:
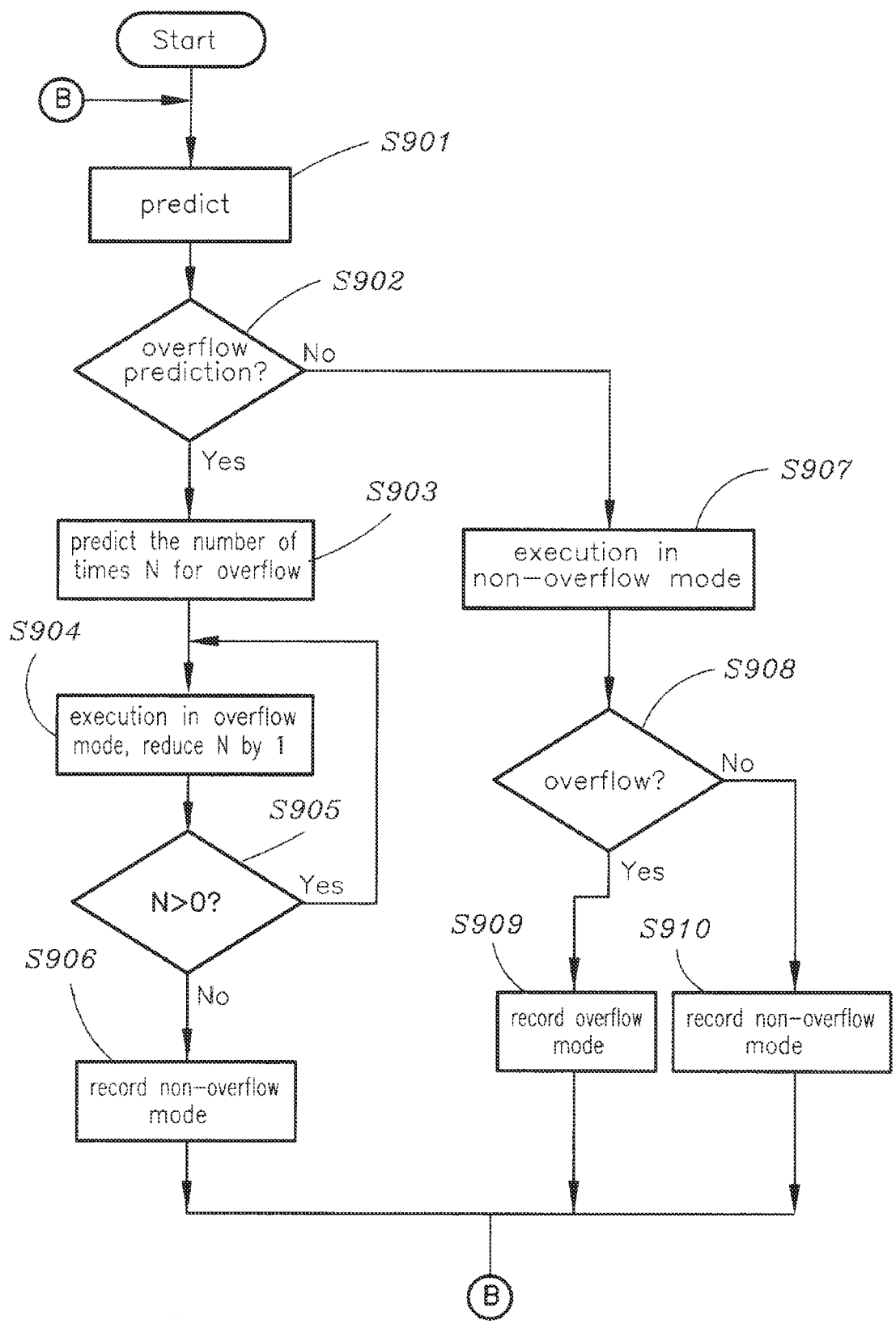
FIG. 9 shows a flowchart of the prediction-based transaction execution method according to the second embodiment of this invention.

FIG. 9 shows a flowchart of the prediction-based transaction execution method according to the second embodiment of the present invention.

As shown in FIG. 9, at first, a prediction is carried out for a transaction at step S901. As described above in the detail description of the second embodiment, at step S901, the stored execution mode information is read from the lookup table. At step S902, it is determined whether the prediction result of step S901 is overflow prediction. If not, the transaction is executed in non-overflow mode in step S907. Then at step S908, it is determined whether the execution finishes with overflow. If an overflow occurs, the execution mode information for this transaction is modified to overflow prediction at step S909, otherwise it is retained as non-overflow at step S910.

On the contrary, if an overflow mode is determined at step S902, the overflow times N is predicted at step S903. Then the transaction is executed in overflow mode at step S904, and the number of the predicted overflow times N is reduced by 1. At step S905, it is determined whether the N is greater than 0 in order to determine whether or not the transaction will be executed in overflow mode next time. If the N is greater than 0, the process returns to S904, that is, the transaction will be executed in overflow mode next time. Otherwise, if N is not greater than 0, the execution mode of this transaction is modified to non-overflow at step S906.

Advantageously, exponential incremental policy is adopted at step S903 to guess how many times the transaction will overflow. For example, if the prediction unit currently predicts that a transaction will overflow N times, the next N execution of the transaction will be in overflow mode. After the N execution of the transaction in overflow mode, the corresponding prediction bit is flipped by the prediction unit, that is, the transaction is predicted not to overflow. However, if an overflow occurs in the N+1 execution of the transaction (in non-overflow mode) again, the prediction unit doubles the number of the predicted overflow times N, that is, the transaction is predicted to overflow 2N times.

Although in the above description, the next execution mode information for a transaction is recorded each time the transaction finishes, and a prediction is made by reading the execution mode information recorded at the end of the last execution of the transaction before the execution of the transaction, it is also possible to record the final status of the current execution when the transaction finishes each time, and to predict the execution mode before each execution of the transaction by reading the final status recorded at the end of the last execution of the transaction and determining the execution mode based on the read final status.

Further, both embodiments 1 and 2 involve the modification of the prediction information stored by the prediction unit. In the above description, it is preferred to modify the prediction information by the execution unit. It will be understood by those skilled in the art that other components, for example a dedicated buffer, may also be used to do so. Physically, regardless of what component is adopted, a predetermined physical signal is sent to the prediction unit, and after receiving the signal, the prediction unit modifies the prediction information according to the algorithm described in the embodiments 1 and 2.

It can be understood by those skilled in the art that the process for predicting whether or not a transaction will overflow can be implemented in the form of any software and/or hardware, and recording media storing programs for executing the method of the present invention.

Exemplary embodiments are described for the purpose of illustration and explanation, which are not exclusive and cannot be treated as limitations to the present invention as well. Many modifications and variance are obvious for those skilled in the art. These embodiments are selected and described to explain the principle and the practice of the exemplary embodiments more clearly, to enable those skilled in the art to understand various implementation methods of these embodiments, wherein, various modifications for specific requirements can be contemplated.

Although embodiments of the present invention have been described with reference to the drawings, various modifications and variances are possible to those skilled in the art without departing from the concept of the present invention, and therefore, its scope is merely defined by the appended claims.

The invention claimed is:

1. A system enabling Transactional Memory comprising:
   a prediction unit configured to predict a mode for a next execution of a transaction based on a final status of a preceding execution of the transaction, the prediction unit comprising a lookup table having a plurality of entries, each of the plurality of entries configured to store a physical address of the transaction in a physical address field and a prediction of whether the transaction will overflow during a next execution in an execution mode information field;
   a transaction write buffer for temporarily storing the speculative data of the transaction during the execution of the transaction in non-overflow mode by the execution unit and for recording data addresses of write operations inside the transaction during the execution of the transaction in overflow mode by the execution unit; and
   an execution unit configured to execute the transaction in the mode predicted by the prediction unit, wherein the mode includes overflow mode and non- overflow mode; the mode for a next execution of the transaction is predicted as overflow mode by the prediction unit when an overflow occurs during the preceding execution of the transaction; and the mode for the next execution of the transaction is predicted as non-overflow mode otherwise,
   wherein the execution mode information field in the lookup table is modified according to a final state of the execution of the transaction,
   wherein as to a transaction executed in overflow mode,
   if the transaction write buffer has enough space to hold all the data addresses of the write operations inside the transaction during the execution of the transaction, the mode for the next execution of the transaction is predicted as non-overflow mode by the prediction unit;
   otherwise, the mode for the next execution of the transaction is predicted as overflow mode by the prediction unit.

2. The system enabling Transactional Memory according to claim 1, further comprising:
   a transaction read buffer for recording data address of read operations inside the transaction during the execution of the transaction by the execution unit;
   wherein as to a transaction executed in overflow mode, if the transaction read buffer does not have space enough to hold all the data addresses of the read operations inside the transaction during the execution of the transaction, the mode for the next execution of the transaction is predicted as overflow mode by the prediction unit.

3. The system enabling Transactional Memory according claim 1, wherein as to a transaction executed in non-overflow mode, if an overflow occurs during the execution of the transaction, the prediction unit further predicts the number of times N the transaction will be executed in overflow mode, and after the next N executions of the transaction in overflow mode, the mode for the next execution is predicted as non-overflow mode by the prediction unit.

4. The system enabling Transactional Memory according to claim 3, wherein when the transaction overflows,
   if the mode of the last execution of the transaction is non-overflow mode, a minimum value Nmin, which is a power of 2, is predicted as the number of times N the transaction will be executed in overflow mode; and
   if the mode of the last execution of the transaction is overflow mode, the prediction unit doubles the number of the times N predicted at the end of the last execution of the transaction as the number of times the transaction will be executed in overflow mode.

5. The system enabling Transactional Memory according to claim 1, further comprising:
   a status register configured to store the execution mode indicated by the execution unit;
   a storage unit configured to write data into a cache or the write buffer;
   a load unit configured to read data from the cache or the transaction write buffer; and
   a data flow controller configured to control the storage unit or the load unit to read or write data according to the execution mode stored in the status register.

6. The system enabling Transactional Memory according to claim 1, wherein if the execution unit does not find in the lookup table the execution mode information corresponding to a transaction to be executed, the execution mode information corresponding to the transaction is created in the lookup table, in which the execution mode is set to non-overflow mode.

7. A transaction execution method based on prediction, comprising:
  predicting, with a prediction unit, a mode for a next execution of a transaction based on a final state of a previous execution of the transaction;
  storing, in a plurality of fields in a lookup table, a physical address of the transaction in a physical address field and a prediction of whether the transaction will overflow during a next execution in an execution mode information field;
  modifying the execution mode information stored in the lookup table according to a final status of the execution of the transaction;
  executing, with an execution unit, the transaction in the mode for the next execution of the transaction, wherein the execution mode includes overflow mode and non-overflow mode;
  predicting the mode for the next execution of the transaction as overflow mode when an overflow occurs in the previous execution; and
  recording in a transaction write buffer data addresses of write operations inside a transaction being executed,
  wherein the prediction step further comprises:
  as to a transaction executed in overflow mode, predicting the mode for the next execution of the transaction as non-overflow mode if the transaction write buffer is sufficient for holding all the data addresses of the write operations of the transaction during the execution of the transaction, otherwise, predicting the mode for the next execution of the transaction as overflow mode.

8. The transaction execution method according to claim 7, wherein the prediction step further comprises the following step of:
  predicting the mode for the next execution of the transaction as non-overflow mode when an overflow does not occur in the previous execution.

9. The transaction execution method according to claim 8, wherein the prediction step further comprises:
  as to a transaction executed in non-overflow mode, further predicting the number of times N the transaction will be executed in overflow mode if an overflow occurs during the execution of the transaction, and after the next N executions of the transaction in overflow mode, predicting the mode for the next execution of the transaction as non-overflow mode.

10. The transaction execution method according to claim 9, wherein when the transaction overflows,
  if the mode of the last execution of the transaction is non-overflow mode, a minimum value Nmin, which is a power of 2, is predicted as the number of times N the transaction will be executed in overflow mode; and
  if the mode for the last execution of the transaction is overflow mode, the number of times N predicted at the end of the last execution is doubled, and predicted as the number of times the transaction will be executed in overflow mode.

11. The transaction execution method according to claim 7, wherein the execution step further comprises:
  recording the data addresses of read operations inside the transaction in a transaction read buffer;
  and the prediction step further comprises:
  as to a transaction executed in overflow mode, predicting the mode for the next execution of the transaction as overflow mode if the transaction read buffer is not sufficient for holding all the data addresses of the read operations inside the transaction during the execution of the transaction.

12. The transaction execution method according to claim 7, wherein the execution step further comprises:
  storing the execution mode information;
  executing store or load operations inside the transaction according to the stored execution mode information.

13. The transaction execution method according to claim 7, wherein if the execution mode information corresponding to a transaction to be executed is not found in the lookup table, the execution mode information corresponding to the transaction is created in the lookup table, in which the execution mode is set to non-overflow mode.

* * * * *